Figure 1:
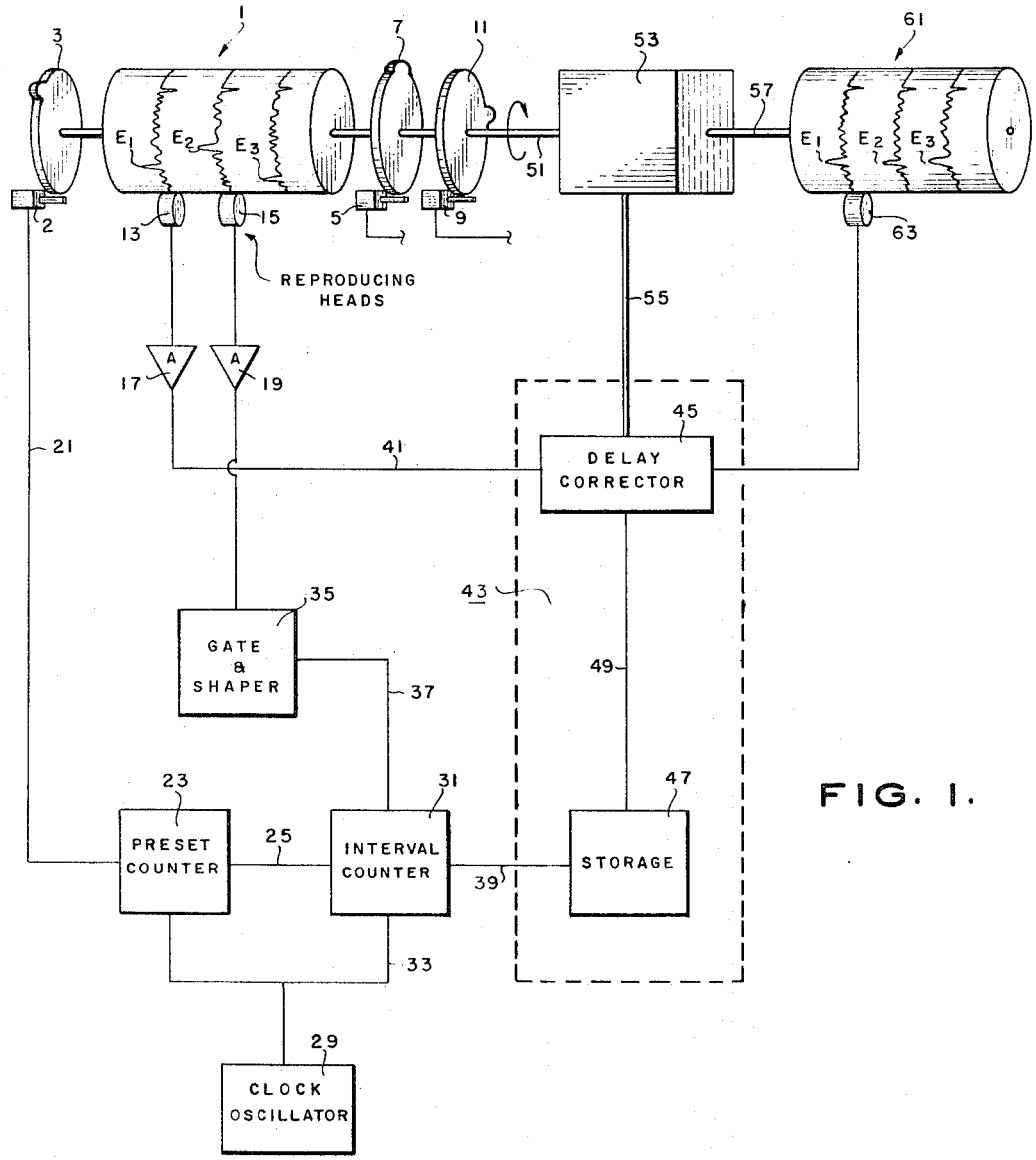

INVENTORS.
TOBIAS FLATOW,
ARMISTEAD M. MOORE,
BY John B. Davidson
ATTORNEY.

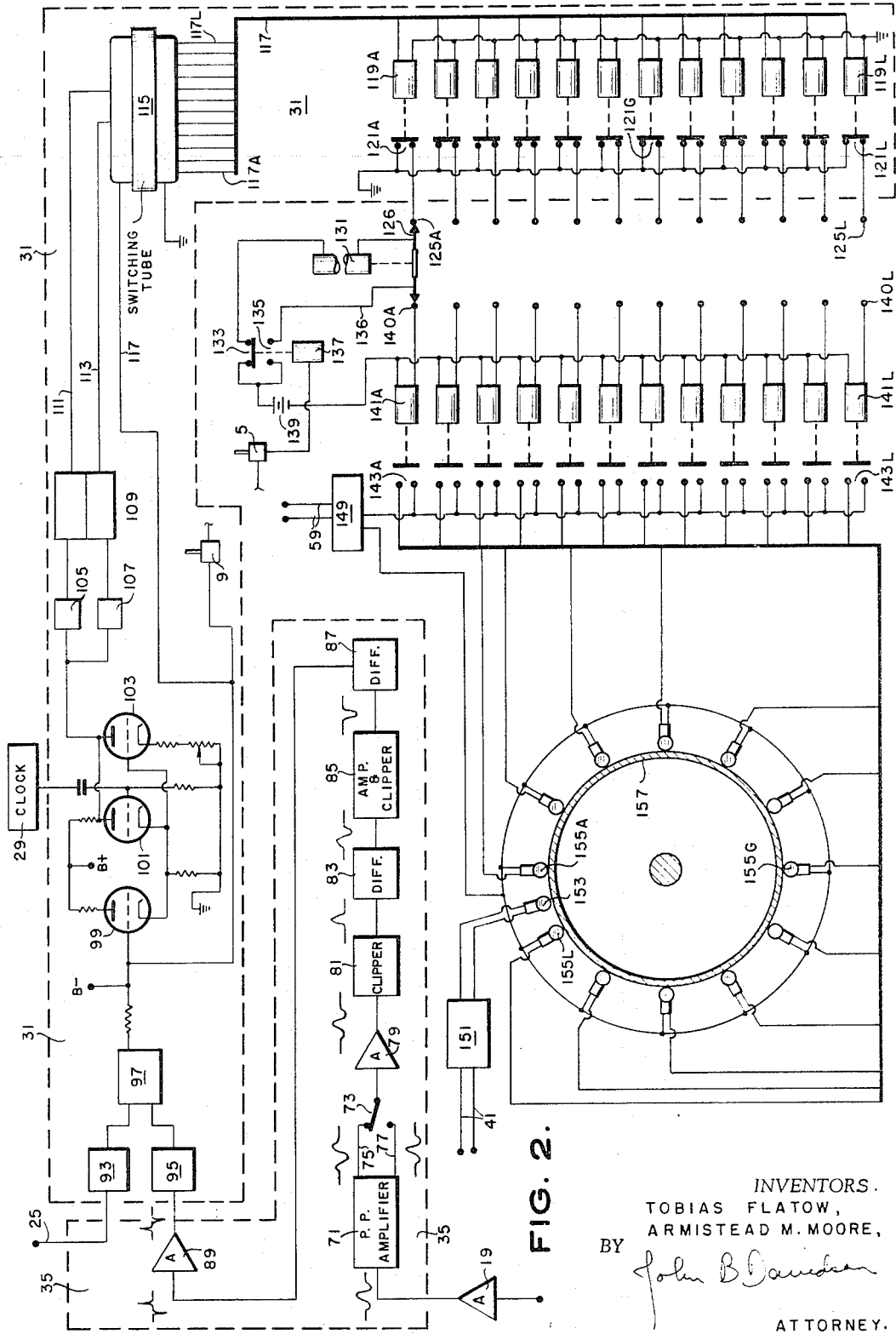

United States Patent Office 3,293,597
Patented Dec. 20, 1966

3,293,597
APPARATUS FOR CORRECTING REPRODUCIBLE SEISMOGRAMS
Tobias Flatow and Armistead M. Moore, Houston, Tex., assignors, by mesne assignments, to Esso Production Research Company, Houston, Tex., a corporation of Delaware
Filed Feb. 17, 1964, Ser. No. 345,209
5 Claims. (Cl. 340—15.5)

This invention relates to geophysical prospecting using seismic techniques, and more particularly to apparatus for operating on the traces of a reproducible seismogram to facilitate interpretation thereof.

The general method of geophysical exploration utilizing seismic waves in the earth is well known. Briefly stated, this method comprises the steps of initiating a seismic impulse at or near the surface of the earth, and recording signals generated by geophones as a result of the earth's movement at one or more points more or less spaced from the point of origin of the impulse. The recordation must permit measurement of the time elapsing between the instant at which the pulse is produced and the generation of signals as a result of the subsequent earth movement. The original impulse will set up elastic waves that are transmitted through the earth. Any discontinuity of structure within the earth will reflect and/or refract a portion of the energy in the waves so that a recording of the signals from the receiving points will comprise a number of arriving waves, each derived from the original impulse, and each differing from the others in time of arrival, magnitude, and wave shape, or all three. It is usual to detect earth movements produced by a seismic impulse at a plurality of locations so that reflections can be more readily identified on the resulting seismogram. Reflections from subsurface reflecting horizons usually will produce events at approximately the same location on the time axis of each of the traces of the resulting seismogram.

Direct reflections from shallow, subsurface reflecting horizons usually may be readily identified on a seismogram. However, direct reflections from deep reflecting horizons are frequently obscured by events due to seismic disturbances with random time distribution, by events produced by reflections from localized reflectors, or by multiple reflections. Generally speaking, the deeper the subsurface horizon, the more difficult it is to distinguish reflections therefrom on seismograms.

The fact that the earth is not homogeneous and isotropic compounds the difficulty of identifying events on seismograms from deep reflecting horizons. As the result of the lack of homogeneity and isotropy in the earth, the travel time from the instant of a seismic impulse to a reflecting horizon and back to a detecting location varies somewhat so that the events do not exactly line up across the seismogram. Some events may arrive slightly ahead of the time at which they would be expected if the earth were homogeneous and isotropic, and other events on the same seismogram may arrive slightly later than such expected time. Other variations in travel time may be attributed to other causes, such as shot hole variations and inaccuracy in shot break timing.

One technique that has been followed in the past to improve the quality of seismograms wherein such "jitter" is observed, has been to assume an average reflection time for an identifiable reflection and to hand-set corrections into a seismogram reproducing system, as by circumferentially adjusting the reproducing heads on a magnetic tape recording-reproducing device, so as to produce a corrected seismogram. Usually, this technique must be repeated several times before a satisfactory record is produced.

In accordance with one aspect of the present invention, apparatus for removing from the traces of a reproducible seismogram variations in the positions of the time axes of coherent events, comprises a pair of signal channels, to which is connected a seismic trace reproducing means for reproducing a given trace of a seismogram as an electrical signal in the two signal channels in succession. In the first signal channel, means are provided for detecting a given event in the electrical signal therein. Connected to the first means and to the reproducing means there is provided a second means for measuring the time interval from the instant of reproduction of events at a given position on the time axis of the seismogram trace to the instant of detection of said given event by said first means. In the second signal channel there is provided means connected to the second means for time delaying the signal in the second signal channel as an inverse function of the time interval measured by the second means. By substantially simultaneously recording the data trace by means connected to the reproducing means, the apparatus makes it possible to align events on the recorded traces so as to eliminate the time variations noted above.

The invention will be further described with reference to the accompanying drawing, wherein:

FIG. 1 is a schematic diagram of a seismogram correcting system in accordance with the invention; and FIG. 2 is a schematic electrical diagram showing in greater detail suitable apparatus for use in the circuit of FIG. 1.

With reference now to FIG. 1, there is shown a drum-type seismogram reproducing apparatus 1 having associated therewith a pair of reproducing heads 13 and 15, and a plurality of cams 3, 7, and 11 which respectively actuate microswitches 2, 5, and 9. An electric motor 53 is connected to the reproducing apparatus 1 and the associated cams by a mechanical or electrical driving connection 51. Through a driving connection 57 motor 53 also drives a seismogram recording apparatus 61 having a recording head 63 associated therewith, and further drives through a mechanical or electrical connection 55 other recording apparatus associated with a delay corrector 45 that will be described in greater detail with respect to FIG. 2. It is manifest that mechanical or electrical connections 51, 55, and 57 may be advantageously combined, as by driving the various recording and reproducing devices from a common shaft.

All of the seismogram reproducing and recording devices mentioned above preferably are of the type utilizing magnetic tapes as a recording medium. However, other types of apparatus utilizing photographic or electrosensitive recording media also may be used in accordance with the broader aspects of the invention.

Reproducing heads 13 and 15 are disposed relative to the drum of the reproducing apparatus 1 so that they reproduce adjacent traces of the seismogram. Also associated with the reproducing heads may be apparatus for moving the heads transversely of the recording medium and parallel to the longitudinal axis of the recording drum so that a given trace is reproduced by the reproducing heads in succession. Apparatus of this nature is well known to the art and will not be described herein in detail.

As noted above, microswitches 2, 5, and 9 are associated with the cams 3, 7, and 11, respectively. The cam 3 is positioned relative to the seismogram carried by the reproducing apparatus 1 so that microswitch 2 is actuated substantially at the timebreak on the seismogram. The cam 7 is positioned so as to actuate the microswitch 5 near the end of each revolution of the drum immediately before actuation of microswitch 2 by cam 3. Cam 11 further is set so as to momentarily actuate microswitch 9 between the times at which microswitches 5 and 2 are actuated by cams 7 and 3, respectively.

Seismic amplifiers 17 and 19 of conventional design are connected to reproducing heads 13 and 15 for amplifying the signals produced thereby. The output signal of amplifier 19 is coupled to the input of a gating and shaping circuit 35 which functions to detect a given event in the electrical signal produced by reproducing head 15 and for producing a very sharp, short-duration output signal responsive thereto. This output signal is fed on line 37 to an interval counter 31, which will be described below.

Microswitch 2 produces a sharp pulse when actuated by cam 3, which pulse is fed on line 21 to a preset counter 23. The function of counter 23 is to measure a predetermined time interval from reception thereby of a pulse on line 21, and to produce an output signal on line 25 at the end of this predetermined time interval. Suitable apparatus for this purpose is manufactured by Southwestern Industrial Electronics Company of Houston, Texas, and designated as Model No. EP. The output signal from counter 23 appearing on line 25 also is fed to the interval counter 31. In addition, the output signal from clock oscillator 29 is applied to counter 31 through line 33. The interval counter functions to measure the time interval between reception of a pulse from line 37 and reception of a pulse from line 25, and to produce an output signal on line 39 indicative of this time interval. Thus, it can be seen that the combined function of counters 23 and 31 is to produce a signal indication of the elapsed time between the timebreak, or zero time on the time axis of the seismogram carried by reproducing apparatus 1, and the reproduction by head 15 of a preselected event on the seismogram.

The output signal from reproducing head 13 is amplified by amplifier 17 and fed on line 41 to an apparatus 43 for storing information indicating the time interval by which the preselected events must be delayed in order to appear at a predetermined location on the time axis of the seismogram, which information is received on line 39, and for delaying the signal on line 41 by such time interval preparatory to recordation of the signal by recording head 63 on a recording medium carried by recording apparatus 61. The information on line 39 is stored by a storage device 47 for one revolution of the drum of reproducing apparatus 1 and is fed to delay-correcting apparatus on line 49. The output signal from the delay corrector 45 is the same as the input signal received from line 41 except that it is delayed by a time interval corresponding to the interval measured by interval counter 31. The time interval to which the preset counter is set to count can be determined from the seismogram to be reproduced by the reproducing apparatus 1. This time is the time from zero time on the seismogram to a time at which signals are produced immediately before production of the first to be produced of the events E1, E2, and E3 when the traces are reproduced simultaneously by the reproducing apparatus in the conventional manner.

With reference now to FIG. 2, there is shown in greater detail a preferred embodiment of the gating and shaping apparatus 35, the interval counter 31, the storage apparatus 47, and the delay corrector 45. The gating and shaping apparatus 35 comprises a paraphase amplifier 71 for amplifying the output signal of amplifier 19 in the form of two signals of mutually opposite phase relationships appearing on output lines 75 and 77. A single-pole, double-throw switch 73 selects one of these signals to be fed to the input circuit of a phase reversing amplifier 79. The output signal from amplifier 79 is clipped by clipper 31 to produce a sharp signal corresponding to the positive peaks of the output signal of amplifier 79, which clipped signal is applied to a differentiating circuit 83. The resulting signal is amplified and clipped by circuit 85, and the resulting signal is differentiated by differentiating circuit 87 to produce sharp pulses at the instant at which a strong event in the output signal of amplifier 19 is known to occur.

When switch 73 is connected to line 75, the second of the sharp pulses will occur at the peak of the event. When the switch is connected to line 77, the pulse will occur at the valley of the event.

The output signal from amplifier 89 and the output of preset counter 23 are respectively applied to the control input circuits of multivibrator 97 through steering diodes 95 and 93 respectively. A negative pulse from the counter 23 triggers multivibrator 97 so that the multivibrator output signal biases vacuum tube 99 to cut off. This permits vacuum tube 101 to act as a conventional amplifier. (When vacuum tube 99 is conducting heavily, the cathode of vacuum tube 101 is raised to cut off so that the tube 101 cannot pass the signal from clock oscillator 29.) The function of vacuum tube 103 is to couple the D.C. shift of the gating pulse applied to clock 29 by multivibrator 97 back to the plate electrode of vacuum tube 101 so that there is no gating transient to produce an error in the counter 23. A negative pulse from amplifier 89 applied to multivibrator 97 through steering diode 95 triggers the multivibrator so that vacuum tube 99 conducts heavily to cut off vacuum tube 101 so that the signal from clock 29 no longer is amplified thereby. Thus, a clock signal will pass through vacuum tube 101 between the times that negative pulses are applied to multivibrator 97 through steering diode 93 and through steering diode 95.

The clock output signal from the vacuum tube 101 is applied to multivibrator 109 through steering diodes 105 and 107. This produces a corresponding square wave signal on output lines 111 and 113 from multivibrator 109. Manifestly, the signals on lines 111 and 113 will have mutually opposite phase relationships. The signals on lines 111 and 113 are applied to a beam switching tube 115 which may be a Burroughs Type 6700 beam switching tube, such as is described in U.S. Patent No. 3,011,583—A. A. Chernosky et al. This type of tube has a multiplicity of spades, switching grids, and targets arranged in a circular manner around the tube, along with a cylindrical permanent magnet that surrounds the envelope thereof. When the switching tube is placed in operation by receipt of a negative pulse at one of the spades, a beam is made to jump from one target to the next adjacent target by means of an alternating timing signal applied to control grids thereof. The direction in which the beam jumps can be controlled by the direction of the magnetic field applied thereto. The signal on lines 111 and 113 applies pulses to the control grids to make the beam jump from one target to the next. A reset signal can be applied to the tube through line 117 to make the beam return to its original position. The individual output signals from the targets are applied to a multiplicity of output lines, two of which are indicated by reference numerals 117A and 117L, the intermediate lines being left without reference numerals to avoid unnecessarily cluttering the drawing. The beam switching tube is a device well known to the prior art and will not be further described herein.

The output lines 117A through 117L from beam switching tube 115 are banded together in cable 117 and individually applied to a mutliplicity of control relays 119A through 119L. These control relays have normally-closed contacts 121A through 121L. Reversals in polarity of the voltages between lines 111 and 113 will sequentially actuate relays 119A through 119L to sequentially open contacts 121A through 121L. Assuming that the output from clock 29 is a 1 kc. signal, the contacts 121A through 121L will open and close in succession so that the final contacts remaining open will be indicative of the number of milliseconds that the clock signal passed through vacuum tube 101. Thus, if contact 121G remains open, this will indicate that a 7-millisecond signal passed through vacuum tube 101, which, in turn, indicates that the time interval between a pulse on line 25 and an output pulse from amplifier 89 is 7 milliseconds.

A magnetic recorder, having a plurality of magnetic reproducing heads 155A through 155L and a recording head 153, is connected through a modulator 151 to line 41. Signals appearing on line 41 are recorded on the magnetic recording medium of drum 157. The output signals from the reproducing heads 155A through 155L are individually connected to a demodulator 149 through the normally-open contacts 143A through 143L, respectively, of relays 141A through 141L. The relays 141A through 141L are actuated in sequence through contacts 140A through 140L of a stepping relay 131 and through the normally-open contact 135 of relay 137. Relay 137 is actuated by microswitch 5 to open contact 133 thereof and to close contact 135 thereof. Stepping relay 131 is caused to step through a stepping cycle thereof when contact 133 is closed by actuation of microswitch 5. The stepping relay steps through contacts 125A through 125L and 140A through 140L simultaneously when contacts 125A through 125L are respectively connected to contacts 121A through 121L to complete the circuit through a battery or other potential source 139 and contact 133. When the moving contact 126 of stepping relay 131 engages a contact that is connected to an open one of contacts 121A through 121L, the stepping switch stops. When contact 135 is subsequently closed, the corresponding one of relays 141A through 141L is actuated to close its contact and connect a corresponding one of reproducing heads 155A through 155L to output line 59 through demodulator 149. Manifestly, there will be a time delay between recordation of a signal by recording head 153 and reproduction of a signal by one of reproducing heads 155A through 155L. If the speed of rotation of drum 157 is such that there is a 1-microsecond difference in the passage of a particular spot on recording head 155 adjacent reproduction heads, then the time delay between recordation of a signal by head 153 and reproduction of the signal by the one of the reproducing heads connected to line 59 will correspond to the interval between application of pulses to steering diodes 93 and 95.

The over-all operation of the apparatus described above with respect to FIGS. 1 and 2 is as follows. Assume that signals have been recorded on the recording medium affixed to the drum of reproducing apparatus 1, and that reproduction of signals thereby starts at the instant that microswitch 2 is closed. Closure of microswitch 2 triggers preset counter 23. Immediately before reproduction of event E2, the preset counter will produce a pulse on line 25 that will trigger interval counter 31 so that the clock signal from clock 29 passes therethrough to storage apparatus 47. When event E2 is reproduced, interval counter 31 will cut off the clock signal. During this reproduction cycle, no signal is applied to line 41. At the end of the reproduction cycle, microswitch 2 is momentarily closed, and stepping switch 131 runs through its cycle until it reaches a contact connected to an open relay, e.g., relay 121G. When microswitch 2 opens, relay 137 actuates one of the relays 141A through 141L to connect a corresponding reproducing head to line 59. On the next cycle of operation of reproducing device 1, the output signal from reproducing head 13 is recorded by recorder 61 after a delay determined by the one of reproducing heads 155A through 155L connected to line 59. Also on this cycle, the next trace adjacent the first trace is reproduced by head 15 so that the time interval between the output signal from preset counter 23 and reproduction of event E1 determines the one of reproducing heads 155A through 155L connected to line 59 at the end of the cycle when microswitch 5 is momentarily closed. (After microswitch 5 is closed on each cycle, microswitch 9 is closed to reset the beam switching tube 115 and the multivibrator 109 to their original conductive states.) On the next reproducing cycle, the trace including event E1 will be reproduced on line 41 so that events E1 and E2 are aligned on the seismogram produced by recorder 61. Also, on the third reproduction cycle, the time interval between an output signal from preset counter 23 and reproduction of event E3 will be stored in storage device 47 and, at the end of the interval, this information will be transferred to delay corrector 45 as described above, so that at the end of the fourth reproduction cycle, events E1, E2, and E3 will be aligned on the record produced by recorder 61. It should be noted that heads 13, 15, and 63 are moved in unison longitudinally along their respective reproducing apparatuses in the customary manner.

From the above it is apparent that there has been provided an apparatus for aligning identifiable events on seismic records so as to eliminate variations on the time axis thereof produced by causes such as the lack of homogeneity and isotropy in the earth. Such alignment of strong events produces records on which weak events can be much more readily identified, in spite of the fact that they are obscured by "noise" on the records.

Although the embodiment disclosed in the preceding specification is preferred, other modifications will be apparent to those skilled in the art which do not depart from the scope of the broadest aspects of the invention.

What is claimed is:

1. Apparatus for removing from the traces of a reproducible seismogram variations of coherent events on the time axis thereof produced by lack of isotropy and lack of homogeneity in the earth, comprising:
   first and second signal channels;
   reproducing means for reproducing each trace of said seismogram in succession in said first and second channels;
   first means in said first signal channel for detecting a given event in the electrical signal therein;
   second means connected to said first means and to said reproducing means for measuring time variations from reproduction of events at a given time on the time axis of said seismogram to detection of said given event by said first means;
   means in said second signal channel connected to said second means for time delaying the signal in said second signal channel inversely in accordance with said time variations; and
   means for recording the time delayed signal from said last-named means.

2. Apparatus for removing from the traces of a reproducible seismogram variations in the positions of coherent events on the time axis thereof produced by lack of isotropy and lack of homogeneity in the earth, comprising:
   first and second signal channels;
   reproducing means for reproducing a given trace of said seismogram as an electrical signal in said first and second signal channels in succession;
   first means in said first signal channel for detecting a given event in the electrical signal therein;
   second means connected to said first means and to said reproducing means for measuring the time interval from reproduction of events at a given position on the time axis of said seismogram trace to detection of said given event by said first means; and
   means in said second signal channel connected to said second means for time delaying said signal as an inverse function of said time interval for substantially simultaneous re-recordation as a data trace.

3. Apparatus for removing from the traces of a reproducible seismogram variations in the positions of coherent events on the time axis thereof produced by lack of isotropy and lack of homogeneity in the earth, comprising:
   first and second signal channels;
   reproducing means for reproducing a given trace of said seismogram as an electrical signal in said first and second signal channels in succession;

first means in said first signal channel for detecting a given event in the electrical signal therein;

second means connected to said first means and to said reproducing means for measuring the time interval from reproduction of events at a given position on the time axis of said seismogram to detection of said given event by said second means;

means in said second signal channel connected to said second means for time delaying the signal in said second signal channel inversely in accordance with said time variations;

means for recording the time delayed signal from said last-named means; and means connected to said second signal channel for recording the time delayed signal therein as a data trace.

4. Apparatus for removing from the traces of a reproducible seismogram variations in the positions of coherent events on the time axis thereof produced by lack of isotropy and lack of homogeneity in the earth, comprising:

first and second signal channels;

reproducing means for reproducing a given trace of said seismogram as an electrical signal in said first and second signal channels in succession;

first means in said first signal channel for detecting a given event in the electrical signal therein;

recording means for recording said electrical signal in said second signal channel as a data trace; and second means in said second signal channel connected to said first means and to said recording means for time delaying said signal in said second signal channel until said event appears at a predetermined location on the time axis of the data trace produced by said recording means.

5. Apparatus for removing from the traces of a reproducible seismogram variations in the positions of coherent events on the time axis thereof produced by lack of isotropy and lack of homogeneity in the earth, comprising:

first and second signal channels;

reproducing means for reproducing a given trace of said seismogram as an electrical signal in said first and second signal channels in succession;

gating and pulse-shaping means in said first signal channel for detecting a predetermined event in the electrical signal therein, and for thereupon producing a sharp electrical output pulse;

adjustable timing means connected to said reproducing means for connecting an electrical output signal at the end of a predetermined time interval after the beginning of reproduction of said trace;

an interval timer connected to said timing means and to said gating and pulse-shaping means, actuatable by the output pulse of said timing means to begin timing the duration of a time interval, and actuatable by said output pulse of said gating and pulse-shaping means to stop timing said time interval, adapted to produce an output signal indicative of the duration of the time interval timed thereby;

means in said second signal channel connected to said interval timer responsive to the output signal thereof to time delay the electrical signal in said second signal channel by a time interval inversely proportional to the time interval timed by said interval timer; and recording means connected to said second signal channel and to said reproducing means for recording the time delayed signal in said second signal channel as a data trace.

References Cited by the Examiner

UNITED STATES PATENTS

| 2,877,080 | 3/1959 | Eisler et al. | 340—15.5 |
| 3,041,578 | 6/1962 | Elliott | 346—35 |
| 3,110,878 | 11/1963 | Horeth et al. | 340—15.5 X |
| 3,134,896 | 5/1964 | Briggs | 343—100.7 |
| 3,196,385 | 7/1965 | Smith | 340—15.5 |
| 3,206,727 | 9/1965 | Picou | 181—.5 X |

FOREIGN PATENTS 1,274,919  9/1961  France.

BENJAMIN A. BORCHELT, *Primary Examiner.*

R. M. SKOLNIK, *Assistant Examiner.*